United States Patent [19]

Putkowski

[11] 4,097,216
[45] Jun. 27, 1978

[54] FILTER FOR LIQUIDS

[75] Inventor: Ladislao W. Putkowski, Scarborough, Canada

[73] Assignee: Magna International Inc., Downsview, Canada

[21] Appl. No.: 776,811

[22] Filed: Mar. 11, 1977

[51] Int. Cl.² .............................................. B01D 35/02
[52] U.S. Cl. ..................................... 425/568; 210/446
[58] Field of Search ................ 210/435, 446, 451, 455, 210/477; 425/197, 199, 564, 566, 568

[56] References Cited

U.S. PATENT DOCUMENTS

| 1,335,899 | 4/1920 | Kahlenberg | 210/446 |
| 1,456,438 | 5/1923 | Hesselman | 210/435 |
| 3,825,123 | 7/1974 | Neuman | 210/446 X |

Primary Examiner—William A. Cuchlinski, Jr.
Attorney, Agent, or Firm—Rogers, Bereskin & Parr

[57] ABSTRACT

An injection nozzle for an injection moulding machine is described. The nozzle includes a body having a filter chamber and a filter element removably received in the chamber in the filter body. The outer surface of the filter element is defined by a plurality of slots which extend generally longitudinally of the element in circumferentially spaced positions, and a corresponding plurality of intervening lands. Each slot has a blind inner end and an outer end which opens into an end of the filter element, the slots being arranged so that alternate slots communicate by way of their outer ends with the filter chamber inlet opening and define with the inner surface of the filter chamber, inlet flow channels for liquid to be filtered, while the intervening slots communicate with the filter chamber outlet opening and similarly define outlet flow channels for said liquid. The lands between the slots define filtering gaps which provide liquid communication between adjacent flow channels and are dimensioned to prevent particles above a predetermined size passing through the filter element.

3 Claims, 5 Drawing Figures

FILTER FOR LIQUIDS

This invention relates to an injection nozzle for a plastic injection moulding machine. In an injection moulding machine, liquid plastic material must be filtered prior to passing through the injection nozzle of the machine into the mould, in order to remove unmelted plastic granules or other foreign materials. Conventional filters for this purpose incorporate filter elements in the form of wire mesh or perforated metal discs. However, a problem with filter elements of this form is that they rapidly become clogged in practice and require frequent cleaning or replacement. In a typical machine, the filter elements would have to be cleaned or replaced every second day. Cleaning is a difficult and time consuming operation while replacement of the discs is expensive. A further problem with filter elements of this type is that there is a high pressure drop across the filter, which is very undesirable in injection moulding.

An object of the present invention is to provide an improved injection nozzle for an injection moulding machine.

According to the invention, the nozzle includes a filter body having a filter chamber with a cylindrical inner surface, and inlet and outlet openings communicating with respectively opposite ends of the chamber. A filter element is removably received in the chamber in the filter body and has an outer surface disposed closely adjacent said inner surface of the chamber. The outer surface of the filter element is defined by a plurality of slots which extend generally longitudinally of the element in circumferentially spaced positions, and a corresponding plurality of intervening lands. Each slot has a blind inner end and an outer end which opens into an end of the filter element, the slots being arranged so that alternate slots communicate by way of their outer ends with the filter chamber inlet opening and define with the inner surface of the filter chamber, inlet flow channels for plastic material to be filtered, while the intervening slots communicate with the filter chamber outlet opening and similarly define outlet flow channels for said material. The lands between the slots define filtering gaps which provide liquid communication between adjacent flow channels and are dimensioned to prevent particles above a predetermined size passing through the filter element.

In order that the invention may be more clearly understood, reference will now be made to the accompanying drawings which illustrate a number of preferred embodiments of the invention, by way of example. In the drawings.

Figure 1:
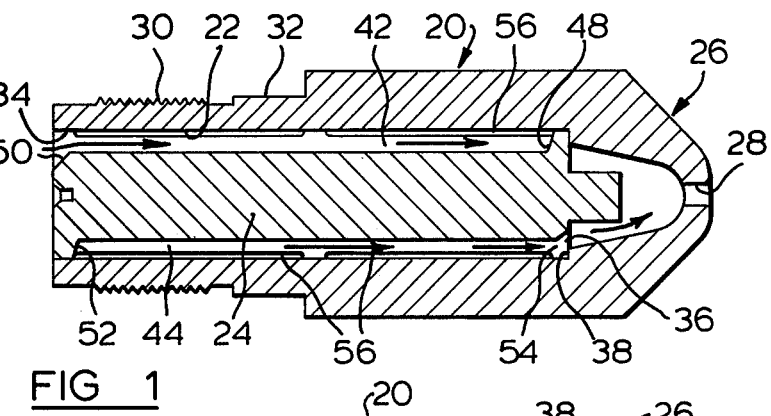
FIG. 1 is a longitudinal sectional view through an injection nozzle for a plastic injection moulding machine according to the invention taken on line I—I of FIG. 2.

Referring first to FIG. 1, the nozzle includes a body generally indicated at 20 which has an internal filter chamber 22 receiving a filter element 24. Body 20 has an outlet end 26 formed with an injection opening 28 through which plastic material is delivered into a mould in use. Neither the mould nor the injection moulding machine itself are shown in the drawings since they form no part of the invention. However, it will be noted that the body 20 is formed with an external screw thread 30 adjacent its end remote from nozzle 26, by which the body can be screwed into an injection moulding machine. A hexagonal surface portion 32 is provided adjacent screw thread 30 (see also FIG. 2) so that a wrench can be used to tighten the body into the machine.

The filter chamber 22 of body 20 has a cylindrical inner surface and inlet and outlet openings 34 and 36 respectively at opposite ends. Inlet opening 34 in fact defines an open end of the chamber through which the filter element 24 may be inserted into and removed from the body. The outlet opening 36 is surrounded by a shoulder 38 against which the filter element is located when in its fully inserted position in the filter chamber.

Figure 2:
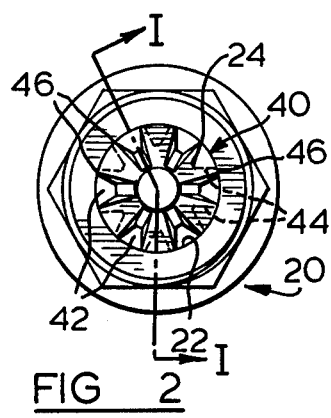
FIG. 2 is an end view in the direction of arrow A in FIG. 1.
Figure 3:
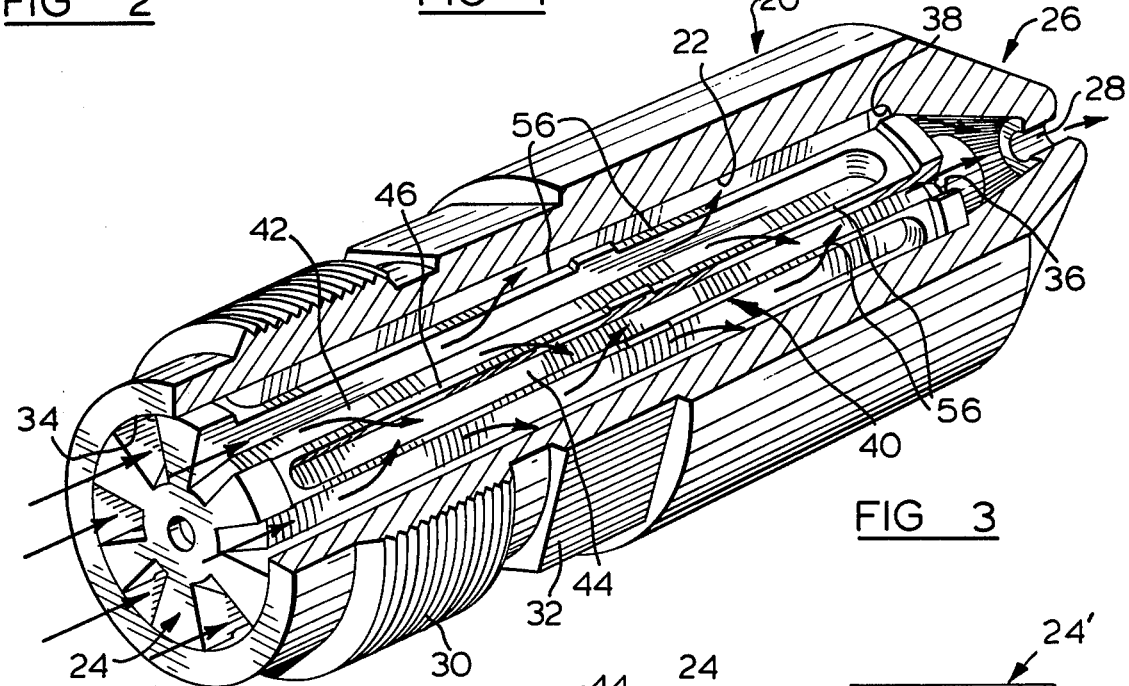
FIG. 3 is a perspective view generally in the direction of arrow A in FIG. 1 with the body of the nozzle partly broken away.

Referring now more particularly to FIGS. 2 and 3, the filter element has an outer surface 40 which is disposed closely adjacent the inner surface of the filter chamber 22 so that the filter element is a close sliding fit in the chamber. The outer surface 40 of the filter element includes a plurality of slots (in this case 12 in number), alternate ones of which are denoted 42, while the intervening slots are denoted 44, and a corresponding plurality of intervening lands 46. The slots extend generally longitudinally of the filter element in positions spaced circumferentially of the element by said lands. Each slot has a blind inner end and an outer end which opens into an end of the filter element and the slots are alternately arranged so that the open outer ends of the slots 42 communicate with the filter chamber inlet 34 while the outer ends of the intervening slots 44 communicate with the filter chamber outlet 36.

Referring back to FIG. 1, one of the slots 42 is visible at the top of the filter element and one of the slots 44 is visible at the bottom of the element. The blind inner end of slot 42 is denoted 48 while its open outer end is denoted 50. Similarly, the blind inner end of slot 44 is denoted 52, while its open outer end is denoted 54. The outer ends 50 and 54 of the respective slots are flared slightly to promote smooth, turbulence free liquid flow. The slots 42 define with the inner surface of the filter chamber 22, inlet flow channels for a liquid to be filtered, while the slots 44 similarly define outlet flow channels for the liquid.

The lands 46 between the slots 42 and 44 are relieved to define filtering gaps 56 which provide liquid communication between the inlet and outlet flow channels provided by the slots 42 and 44. Thus, it will be seen from FIG. 1 that each of the lands 46 defines two filtering gaps 56 disposed in end to end positions and extending longitudinally of the filter element parallel to the slots 42 and 44. The filtering gaps 56 are dimensioned to prevent particles above a predetermined size passing through the filter element. The arrows in FIG. 3 illustrate the path of liquid entering the filter by way of the slots 42, and passing into the outlet flow channels defined by the slots 44 by way of the filtering gaps 56.

In order to avoid a pressure drop because of the filtering gaps, the area of each gap and the cross-sectional area of each inlet slot 42 are selected so that the total area of all the filtering gaps 56 exceeds the total cross-sectional area of all of the inlet slots. The height of the filtering gaps is chosen according to the size of particle to be retained by the filter. However, it will be appreciated that the longitudinal extent of the filter gaps may be selected as appropriate to provide the required total cross-sectional area.

Tests conducted using the filter according to the invention in a conventional plastic injection moulding machine have indicated that the filter will operate satisfactorily for extended periods of time without cleaning. Specifically, a filter operated satisfactorily for a period of approximately 1 month. When the filter does become clogged, it is simply removed from the machine by unscrewing the thread 30 and the filter element 24 is knocked out of the filter body by inserting a rod through opening 28 of nozzle 26. The slots in the outer surface of the filter element can then be readily cleaned, for example, by wiping foreign material from the slots, or by using a gas flame.

Figure 4:
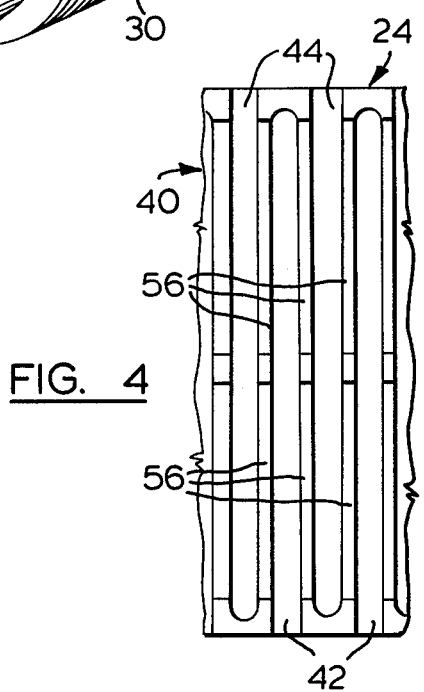
FIG. 4 is a developed view of part of the filter element shown in the previous figures; and, FIG. 5 is a view similar to FIG. 4 showing a modified form of filter element.
Figure 5:
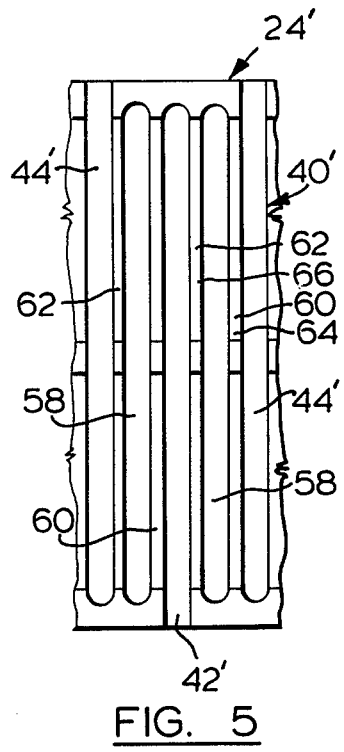

FIG. 4 of the drawings is a developed view of part of the outer surface of the filter element 24 shown in the previous figures. This view shows the alternate arrangement of the slots 42 and 44 with the lands 46 therebetween. FIG. 5 is a view similar to FIG. 4 illustrating an alternative embodiment of the invention. Primed reference numerals have been used in that view to denote elements which correspond with the previous views. It will be noted that, in this case, adjacent inlet and outlet slots 42′ and 44′ respectively are separated by a further slot 58 which is blind at both ends and which is separated from adjacent slots by lands 60 and 62, each formed with relieved portions 64 and 66 respectively defining filtering gaps similar to the filtering gaps 56 of the previous embodiment. These blind ended slots 58 are provided between each adjacent pair of inlet and outlet slots 42′, 44′ respectively. Slots 58 define with the inner surface of the filter chamber of the filter, mixing channels which serve to induce turbulence in the liquid plastic material flowing through the filter to promote mixing thereof and improve the homogeneity of the plastic material. Conveniently, the filtering gaps 64 and 66 will be of the same size as one another, although they could be differently sized to promote increased turbulence if appropriate.

It should finally be noted that the preceding description relates to specific embodiments and that many modifications are possible within the broad scope of the invention. For example, in the embodiments described, the filter body and filter element are made by precision machining in steel. However, other materials could alternatively be used. In another embodiment, the filter element could itself be a moulding in a plastic or other material. A further possibility would be to make the filter element in the form of an assemblage of initially separate components, in the manner of a cage.

I claim:

1. An injection nozzle for a plastic injection moulding machine, the nozzle comprising:
   a body of generally cylindrical form having:
     an internal passageway which extends from an inlet end of said body to an outlet end of the body and through which plastic material can flow from said inlet end to said outlet end when the nozzle is in use, said passageway including a plastic injection opening at said outlet end of the body and a cylindrical filter chamber defined by a cylindrical inner surface portion of said body, one end of said chamber opening into said inlet end of said body and the opposite end of said chamber communicating with said plastic injection opening in the body;
     an external surface which includes a generally conical surface portion at said outlet end of the body, tapering towards said plastic injection opening; an externally screw threaded portion adjacent said inlet end of the body, by which the nozzle can be secured in an injection moulding machine; and a plurality of flats adjacent said screw threaded portion at the side thereof remote from said inlet end of the body, by which the body can be turned for securing the nozzle in the machine;
   and a filter element removably received in said filter chamber and having an outer surface disposed closely adjacent said cylindrical inner surface portion of said body, said outer surface being defined by a plurality of slots which extend generally longitudinally of the filter element in circumferentially spaced positions and a corresponding plurality of intervening lands, each slot having a blind inner end and an outer end which opens into an end of the element and the slots being arranged so that alternate slots open at their outer ends at said inlet end of the body and define with said inner surface portion of the filter chamber, inlet flow channels for plastic material flowing through said body in use, while the intervening slots communicate with said plastic injection opening and similarly define outlet flow channels for said plastic material, the lands between the slots being longitudinally relieved to define filtering gaps which provide liquid communication between adjacent flow channels and which are dimensioned to prevent particles in said plastic material above a pre-determined size passing from said inlet flow channels to said outlet flow channels.

2. A nozzle as claimed in claim 1, wherein the total area represented by all of the filtering gaps in the filter element exceeds the total cross-sectional area of said inlet flow channels.

3. A nozzle as claimed in claim 1, wherein each of said lands in the outer surface of the filter element includes a slot having blind opposite ends, the portions of the land on opposite sides of said slot being relieved to define filtering gaps which provide liquid communication between said blind ended slot and adjacent inlet and outlet slots, whereby each of said blind ended slots co-operates with the inner surface of the filter chamber to define a mixing chamber for plastic material flowing through said passageway in use.

* * * * *